US012700295B2

(12) United States Patent
Yair

(10) Patent No.: US 12,700,295 B2
(45) Date of Patent: Aug. 4, 2026

(54) IOT SECURITY DEVICE

(71) Applicant: Essence Security International (E.S.I.) Ltd., Herzlia Pituach (IL)

(72) Inventor: Shalom Yair, Even Yehuda (IL)

(73) Assignee: Essence Security International (E.S.I.) Ltd., Herzlia Pituach (IL)

( * ) Notice: Subject to any disclaimer, the term of this patent is extended or adjusted under 35 U.S.C. 154(b) by 105 days.

(21) Appl. No.: 18/861,875

(22) PCT Filed: May 2, 2023

(86) PCT No.: PCT/IL2023/050451
§ 371 (c)(1),
(2) Date: Oct. 30, 2024

(87) PCT Pub. No.: WO2023/214411
PCT Pub. Date: Nov. 9, 2023

(65) Prior Publication Data

US 2025/0285530 A1 Sep. 11, 2025

(30) Foreign Application Priority Data

May 3, 2022 (GB) ..................................... 2206415

(51) Int. Cl.
*G08B 25/00* (2006.01)
*G08B 13/196* (2006.01)
(Continued)

(52) U.S. Cl.
CPC ......... *G08B 25/008* (2013.01); *G08B 13/196* (2013.01); *G08B 15/00* (2013.01); *G08B 25/10* (2013.01); *G08B 29/181* (2013.01)

(58) Field of Classification Search
CPC .... G08B 25/008; G08B 13/196; G08B 15/00; G08B 25/10; G08B 29/181
(Continued)

(56) References Cited

U.S. PATENT DOCUMENTS 9,728,072 B2 8/2017 Reibel
2016/0105847 A1 4/2016 Smith et al.
(Continued)

FOREIGN PATENT DOCUMENTS

GB 2607570 A 12/2022
WO 2022013863 A1 1/2022
WO 2023/214411 A1 11/2023

OTHER PUBLICATIONS

Foreign Communication from a Related Counterpart Application, International Search Report and Written Opinion dated Aug. 28, 2023, International Application No. PCT/IL2023/050451 filed on May 2, 2023.
(Continued)

*Primary Examiner* — Eric Blount
(74) *Attorney, Agent, or Firm* — Conley Rose, P.C.

(57) ABSTRACT

A security response device is capable of being held in a communications mode or a power saving mode. In the communications mode, it is capable of sending a security threat message to a base station and of receiving a response. In the power saving mode, it is capable of detecting security threats but not performing communication functions. Detection of a security threat causes the device to exit the power saving mode and enter the communications mode. The device holds a record of its arming state, but the authentic record of the device's arming state is held remotely. If the device's local arming state is armed, then the device responds without waiting for an update from the base station. If the device's local arming state is disarmed, then the device does wait for an update from the base station.

20 Claims, 11 Drawing Sheets

(51) Int. Cl.
*G08B 15/00* (2006.01)
*G08B 25/10* (2006.01)
*G08B 29/18* (2006.01)

(58) Field of Classification Search
USPC .......................................................... 340/506
See application file for complete search history.

(56) References Cited

U.S. PATENT DOCUMENTS

2020/0158510 A1 5/2020 Korneluk et al.
2020/0342748 A1 10/2020 Tournier et al.

OTHER PUBLICATIONS

Foreign Communication from a Related Counterpart Application, United Kingdom Combined Search and Examination Report dated Jul. 5, 2022, United Kingdom Application No. 2206415.8 filed on May 3, 2022.

LOCAL DISARMED

*LOCAL DISARMED, REMOTE DISARMED*

*LOCAL ARMED, REMOTE DISARMED*

*LOCAL DISARMED, REMOTE ARMED*

IOT SECURITY DEVICE

CROSS-REFERENCE TO RELATED APPLICATIONS

The present application is a filing under 35 U.S.C. 371 as the National Stage of International Application No. PCT/IL2023/050451, filed May 2, 2023, entitled "IOT SECURITY DEVICE," which claims priority to United Kingdom Application No. 2206415.8 filed with the Intellectual Property Office of the United Kingdom on May 3, 2022, and entitled "IOT SECURITY DEVICE," both of which are incorporated herein by reference in their entirety for all purposes.

FIELD

The present disclosure is in the field of security devices enabled to connect to a cellular network.

BACKGROUND

Systems for use in providing a security function in a premises or other area of interest, often comprise a plurality of discrete security devices and a control hub, which is locally installed. In background examples, a security system can comprise a plurality of monitoring devices each connected to a control hub by means of electrical connections. This can involve significant effort and disruption for installation.

Security devices may have functionality to take one or more actions in response to an identified threat. Such "security response actions" may include verification actions, such as capturing a photo or video, or deterrent actions, such as outputting one or more deterrents. The deterrent action may comprise an audible or visible emission (e.g. a siren or flashing light). Additionally or alternatively the deterrent may comprise the outputting of a deterrent that is neither visual or nor audio, such as a visible-light obscuring matter e.g. smoke, water vapour or other light-obscuring substance, or any other physiologically and/or psychologically influencing deterrent. Such other deterrents may provide a stronger level of deterrence than visual and/or audio deterrents. In the case of outputting of light obscuring substance, for example, the substance hinders visibility in the environment, deterring an intruder from remaining or advancing in the environment.

In order to avoid substantial disruption and cost of installation, security devices can be battery-powered and capable of establishing a local wireless connection with a locally installed control hub. However, the power consumption constraint associated with battery power can limit the capability of a security device, particularly if it is required to maintain a local wireless connection to the control hub.

DESCRIPTION OF EMBODIMENTS

Figure 1:
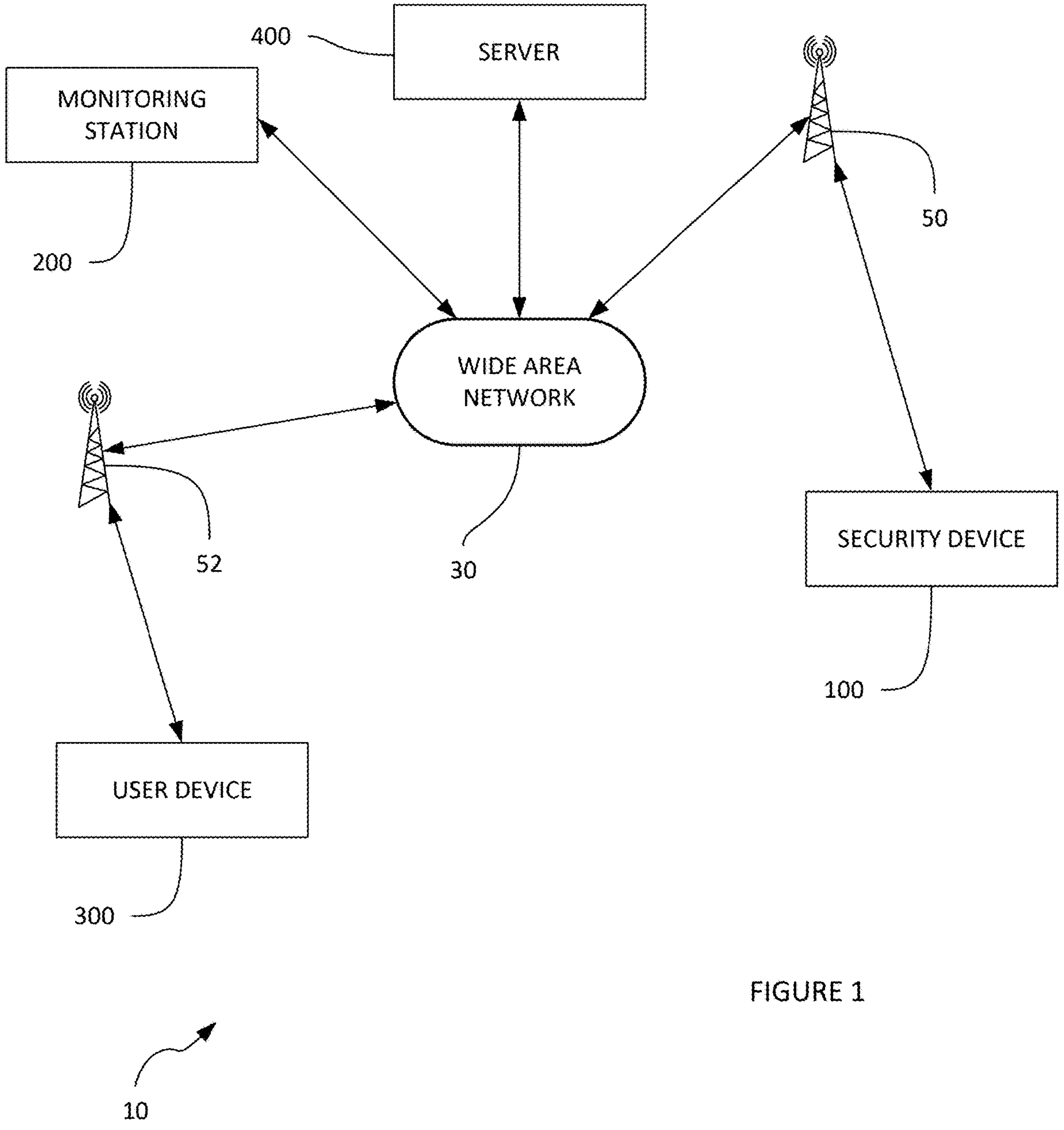
FIG. 1 illustrates a security network in accordance with an embodiment.

In general terms, the following disclosure concerns a security response device capable of being held in a communications mode or a power saving mode. In the communications mode, it is capable of sending a security threat message to a base station and of receiving a response. In the power saving mode, it is capable of detecting security threats but not performing communication functions. Detection of a security threat causes the device to exit the power saving mode and enter the communications mode. The device holds a record of its arming state, but an authentic record of the device's arming state is held remotely. The device responds to a threat based on its locally held record of the arming state, and a mechanism is provided for responding to a disparity between this and the remotely held authentic record of arming state.

In general terms, embodiments of a security response device are disclosed, which are able to establish a wireless communications channel with a server. The wireless communications herein may be cellular, for instance LTE compliant, for example in accordance with CAT M1 or CAT NB2 parts of the LTE protocol, in some embodiments. This obviates the need for a locally installed control hub. In some embodiments, the security response device comprises a cellular modem for establishing such connection. The wireless communications interface may, in other embodiments be a Wi-Fi™ interface. Regardless of whether by a cellular or by a Wi-Fi™ interface, the wireless communications interface communicates with the server according to a wide area network, WAN, address of the server and/or an identifier for determining the WAN address of the server, for example using a Domain Main System (DNS) Server. For example, the address and/or identifier may be included in cellular communications via the wireless communications interface for routing of the communications, via the WAN, to server. However, a cellular interface is particularly advantageous because no additional local devices are required for access to the WAN and/or because it may provide for more reliable connectivity in comparison with typical home Wi-Fi™ environments. In any case, regardless of whether having a cellular or a Wi-Fi™ interface, the device is operable in a power saving mode in which the communications capabilities of the wireless communications interface are inhibited. In this mode, the device is not able to receive wireless communications.

In embodiments, the security response device comprises a security threat sensor for detecting a security threat. When a security threat is detected, the device initiates the emission of a security threat signal. This is achieved by exiting the power saving mode, and enabling use of the wireless communications interface. In embodiments, the device is battery powered, and the use of the wireless communications interface implicates power consumption. So, the power saving mode enables avoidance of unnecessary power consumption which would otherwise arise from maintaining the wireless communications interface in a receptive mode in which it is listening for wireless signals. Instead, by limiting such listening to periods when such communications are deemed necessary, such as when a threat is detected and an instruction on how to respond may need to be received, the power consumption of the device can be managed.

In embodiments, the security response device comprises a local arming state store. The local arming state store comprises a record of a most recently known state of a remote arming state of the device, wherein the remote arming state of the device is held remotely, in a remote arming state store. The remote arming state is selected from a group comprising armed and disarmed.

While there is a desire to maintain the security response device in the power saving mode as much as possible to conserve local source of electrical energy, it may also be desirable to maintain the established connection to the wireless network. This may be achieved by the security response device occasionally (although potentially even on the scale of months) waking temporarily from its power saving mode to send a signal to the wireless network, and then returning to power saving mode. More commonly, there is occasional temporary waking to transmit a maintenance signal that may be used either to maintain a connection to a service (e.g. a keep alive signal) and/or to tell a server that the device is still functioning healthily (e.g. a signal for supervision purposes). Optionally the signal may comprise a tracking area update. In some embodiments, this is performed with a periodicity, which can be set, for instance, by way of a tracking area update timer, that may for example be between 1 and 4 hours, e.g. every 2 hours.

In some embodiments, when in the power saving mode, the security device inhibits all functions of the wireless communications interface. It may be convenient or desirable to temporarily exit the power saving mode, even when there is no security activity, to enable transient communication of information to the wireless network and/or a server, and enabling receipt of data in response thereto. For example, in the case of the wireless communications interface being for a cellular connection, the cellular connection may be maintained by transmitting tracking area update.

In an embodiment, the device is operable to wake from the power saving mode to enter a communications mode comprising a receptive mode after emission of a security threat signal, for a predetermined time period. In some embodiments, for example involving cellular communications, the receptive mode is a "discontinuous receive" (often referred to as DRX) mode in which the device enables the cellular modem for reception capability intermittently, e.g. listening periods spaced by non-listening (optionally sleep) periods, with the listening periods repeating with a periodicity in the range of 0.64 to 5.12 seconds, within the predetermined time period, so as to avoid excessive power consumption. For example, while in DRX mode, the device may listen for approximately 40 ms every 2.56 seconds. The duration of the predetermined time period is the same as the duration set in LTE by the T3324 Active Timer (also referred to herein simply as T3324).

The arming state defines whether the device is either in an "armed" state, in which the security device will carry out a threat response action (also referred to herein as a security response action or a security threat response response), or an "disarmed" state in which it will not. The arming state of the security device may be specific to that security device or may be of the security system as a whole, or to a part thereof, to also be applicable to other devices in the security system.

In embodiments, knowledge of the current arming state of the device is maintained by way of the remote arming state held, for example, at the server. A local copy of this information is held at the device itself. This means that the device can be responsive to its locally held arming state, until an update is received as to the remote arming state. This obviates the need for the device to wait to learn what its arming state is, before responding to a detected security threat.

The local arming state is, in embodiments, updated by way of a response to a threat detection signal to, for instance, a remote server.

It should be noted that while embodiments are described that do not include a control hub local to the secured premises, the present disclosure does not preclude provision of a control hub.

As illustrated specifically in FIG. 1, a security system 10 comprises a security device 100, installed in a premises, capable of establishing a cellular connection with a cellular network as represented by a cellular network base station 50. The cellular network establishes a connection with a wide area network 30, generally a wired or predominantly wired network, for example an interconnected network of networks such as the internet. The reader will appreciate that network conditions may change over time, and the particular cellular network base station that a device connects to may change. As will the reader will also appreciate, the security device 100 may, in other embodiments, connect to the wide area network 30 via a Wi-Fi™ access point (not shown).

The security device 100, as will be described in further detail in due course, has a capability to monitor a scene for a security threat. The security threat could comprise an unauthorised person in a secured location, a vibration or other kinetic impulse commensurate with an attempt to gain entry to a secured location, or a sound indicative of an unauthorised intrusion. The detector may be a detector of electromagnetic radiation, an audio detector, magnetic detector for a door/window, or any other detector suitable for detecting a threat.

The detector may be passive or active. A passive device generally detects incident energy imparted thereon from ambient conditions; an active device effects an emission and then determines a response to reflections of that emission back on the device. Such a detector may be used to detect motion.

In an example, the detector is an electromagnetic detector; in one example it is an infrared detector, which is preferably a passive infra-red detector.

If the detector is an active detector, it may be a doppler detector based on radio waves light or sound waves, and/or it may comprise a ranging function. Examples of devices with ranging facilities include Radar, Lidar and Sonar, which tend to include doppler functionality as well.

Further in FIG. 1, a monitoring station 200 also has connection to the network 30, and is thus capable of communication with the security device 100. As illustrated, the monitoring station 200 is in the same cell of the cellular network and thus connects to the same base station 50 as the security device 100, but this need not be the case.

The monitoring station 200 can be implemented as an application specific device, or can be implemented on a general purpose computer with capability to connect to the network 30, for instance by a fibre-implemented network and via components of the Internet.

As noted above, the security device 100 is configured such that it can be placed in a power saving mode, in which it disables wireless communication. It exits the power saving mode and activates its wireless communication capability on detection of a security threat, the wireless communication capability being initiated upon transmitting a signal to the network 30, e.g. to a server 400, and maintained for a time to listen for any messages, such as a response from the server 400. The server 400 is provided to interface between (a) the security device 100 and (b) the monitoring station 200 and/or a user device 300, for example by relaying information between them. The server 400 is configured with functions to enable responsiveness to the arming state of the security device 100 and to various responses to actions initiated by the security device 100 and, as the case may be, the monitoring station 200 and the user device 300.

Thus, when the security device 100 is not in the power saving mode, a remote device (e.g. the server 400) can communicate with the security device 100. The server 400 can thus receive a security threat signal from the security device 100, and can then initiate in the security device 100 an appropriate response, optionally as commanded by the monitoring station 200 or user device 300. Thus the monitoring station 200 and/or user device 300 may be referred to herein as an operator node.

On the other hand, when the security device 100 is in the power saving mode, the server 400 cannot communicate with the security device 100.

In one embodiment, the monitoring station 200 provides a human operator interface. This can allow a number of different human monitoring facilities, which may be at a specific site and/or may be distributed. So, for example, on receipt of a security threat signal, the monitoring station 200 may trigger a human operator to make response decisions as to how the security device 100 should respond. Based on a response decision made by the human operator, and communicated to the monitoring station 200 using human input action, the monitoring station 200 can send a security threat response signal back to the server 400, which sends a corresponding security threat response signal back to the security device 100. While the server monitoring station 200 is in the described embodiments remote from the server 400, in other embodiments the functions of the server 400 may be provided by hardware of the monitoring station 200.

The security device 100 can then be responsive to receipt of a security threat response signal to make a security response action. Such an action can be, as mentioned above, audible, visible, or any other response such as could be envisaged by the reader. For instance, a deterrent could be emitted, such as comprising: light, audio, tear gas, visible-light obscuring matter, fluid, paralyzing substance, pepper spray, sneeze inducing spray, a high output sound pressure, an electrically conductive projectile, a stink bomb, intermittent light, a physical deterrent, a physiologically affecting deterrent, or a psychologically affecting deterrent.

The response at the server 400 may be dependent on an arming state of the security device 100. Generally, as will be familiar to a reader, a security system applied to a location to be secured, can be "armed", or "disarmed". In an armed state, the system is configured so that detected threats result in a security response, whereas in a disarmed state, a detected threat leads to no security response. Where multiple devices are included in the security system, there may be hybrid states between these two. For instance, in a multi-zone installation, different zones may be armed while other zones remain disarmed. This is useful for example if, in a residential dwelling, it is intended to allow occupants to retire to sleeping quarters while securing other parts of the dwelling. The singular device 100, however, may more specifically be intended to be in either an armed or disarmed state.

For the purposes of this disclosure, the arming state of the installation, of which the security device 100 is a part, is stored remotely of the device 100. This remote arming state is replicated by a local arming state held at the security device 100. The security device 100 will respond to any detected security threat by sending a threat detection signal. This triggers the server 400 to provide an update as to the remote arming state. Even while waiting for this update, if the device itself has a local arming state of "armed", the device 100 will take steps to perform a verification action in which a device (a verification device) other than the security threat sensor is used to gather security threat information to enable a verification of the detected security threat. For example the security threat sensor may be a PIR sensor and the verification device may be an image sensor. Irrespective of what the verification device is, it, like the security threat sensor, is part of the device 100. This means that the device 100 is not waiting for confirmation of its arming state before taking a verification action, and thus reducing the possibility that a security threat may evade an appropriate security response. By performing this verification action without substantial delay, there may be a reduced risk that the security threat will evade detection and/or that false alarms will occur.

It may be, for instance, that, when the remote arming state is "disarmed", the server 400 makes no response at all to receipt of a security threat detection. It could make a record of receipt, or it could discard the signal completely. It may not thus trigger any form of response from a human operator at the monitoring station 200. It may still send a return message to the device 100, so as to provide an update to the local arming state.

When the remote arming state is "armed", by contrast, the server 400 makes a response, which could be based on human operator action at monitoring station 200, or could be automatic—so, for instance, in certain systems, a receipt of a threat detection signal may automatically trigger a threat response signal being sent back to the security device 100.

Configuration of the armed/disarmed state, and other operational parameters, may be made by human input action at an application (an "app") hosted on the user device 300. The user device 300 also has cellular connection capability. As noted in FIG. 1, the user device 300 can connect to another cellular base station 52 to enable establishment of a connection to the network 30 and to the other components as illustrated. So, a user can operate a user device 300 to put the security system into the armed state, regardless of the user's physical location.

The user device 300 may provide an interface to a human operator in addition to or instead of the provision of such an interface by monitoring station 200. Accordingly, the user device 200 may enable a human operator to perform at least the same responses that they may perform at the monitoring station 200 and vice versa. For example, the threat signal can be sent via the server 400 to the user device 300 and/or to the monitoring station 200. A person operating the user device 300 and/or the monitoring station 200 may issue a command, via the server 400, to the security device 100, to output one or more deterrents, or, for instance, to obtain further information about the threat through the capture of video or audio footage by the security device 100. However, the user device 300 is intended for use by an owner or resident of the premises at which the security device 100 is installed, whereas the monitoring station is intended to be staffed by professional operators dedicated to the task of monitoring multiple premises.

The user device 300 may comprise an application specific device, or may be a general purpose device, typically a smartphone, but optionally a tablet or a laptop or the like.

Figure 2:
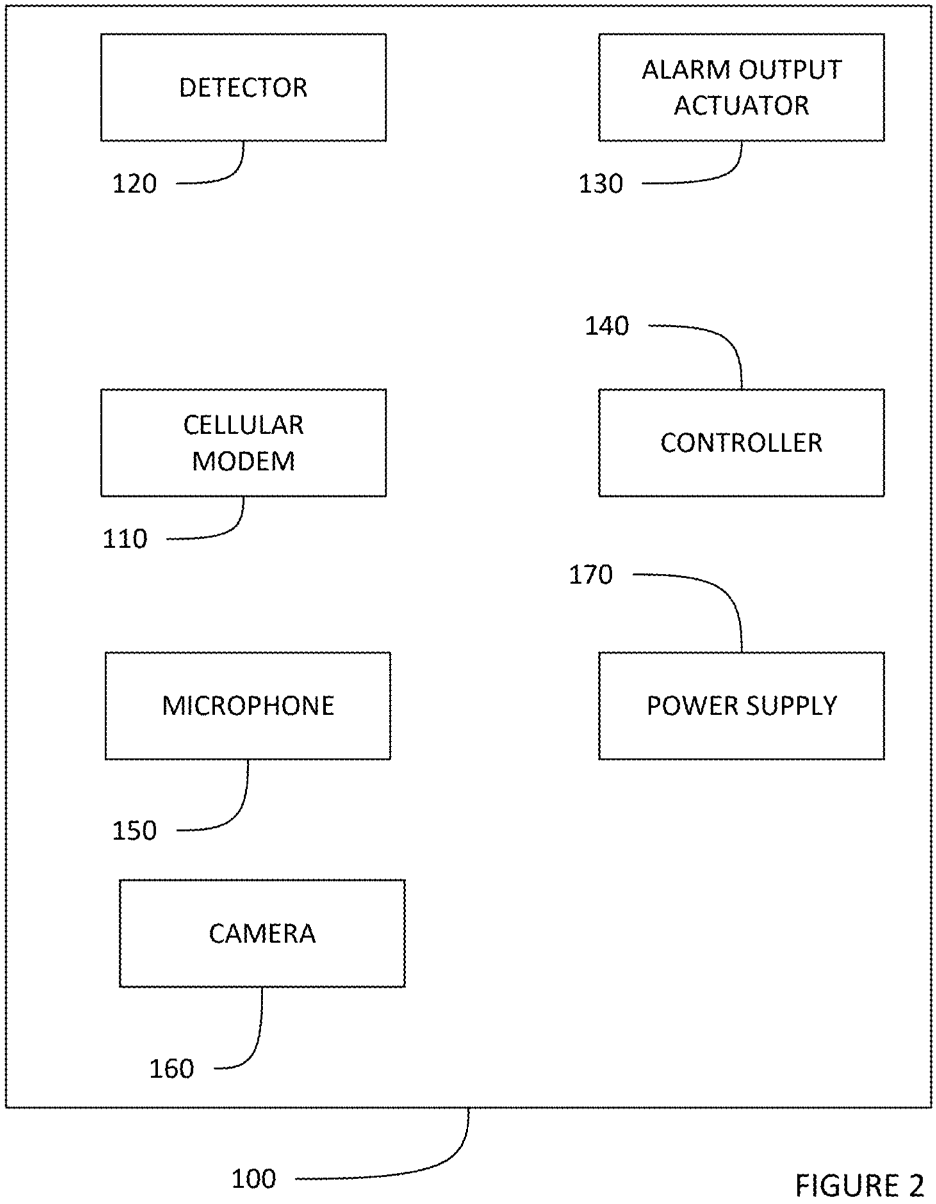
FIG. 2 illustrates a security device of the security network of FIG. 1.

FIG. 2 shows a more detailed view of the security device 100. As mentioned previously in this disclosure, the security device 100 comprises a cellular modem 110 capable of establishing two-way communication, according to an established telecommunications protocol, with a cellular base station, such as the cellular base station 50 as shown in FIG. 1. The cellular modem 110 may for example be provided by integrated electronics, e.g. a dedicated chip, or a module of a processing chip (e.g. a software and/or hardware module, of a CPU of the security device 100), or by a plug-in modem, e.g. a USB modem or the like. The present disclosure is not concerned with any particular telecommunications protocol, but features of LTE will be discussed in due course. In other embodiments a Wi-Fi™ interface (not shown) may be used in addition to or instead of the cellular modem 110. Additionally the device 100 may comprise a speaker (not shown) and an audio controller (not shown).

A detector 120 provides a facility to detect a security threat. As mentioned above, the detector 120 can be of a variety of different possible technologies. For the benefit of this specific example, the detector 120 is a passive infrared (PIR) sensor.

An alarm output actuator 130 is operable, on receipt of a control signal, to cause emission of an alarm output. For the purpose of this example, the alarm output comprises a sound emission from an alarm sounder of the alarm output actuator 130. However, as the reader will appreciate, the alarm output can include emission of any one or more of a light, audio, tear gas, visible-light obscuring matter, fluid, paralyzing substance, pepper spray, sneeze inducing spray, a high output sound pressure, an electrically conductive projectile, a stink bomb, intermittent light, a physical deterrent, a physiologically affecting deterrent, or a psychologically affecting deterrent. The alarm output actuator 130 supplied in a particular embodiment will reflect the specific requirements of the implementation. The alarm output actuator 130 may alternatively be termed a deterrent actuator.

A controller 140 controls operation of the security device 100, according to a procedure that will be described in due course. A microphone 150 and a camera 160 are provided, to offer facilities to gather information as to the nature of a detected threat and to record activity observable at the device 100.

The structure and form of the controller 140 will be implementation specific. In an embodiment, it comprises a central processing unit (CPU) of substantially standard form, and is capable of executing instructions, such as provided in machine code language, to enable performance of its controlling functions. For example, the CPU may comprise one or more microprocessors and/or microcontrollers. Other possible implementations will be recognised by the reader, such as the configuration of an application specific integrated circuit (ASIC) or a field programmable gate array (FPGA), depending on design choices.

A power supply 170 provides power to other components of the device 100. The controller 140 is able to control distribution of power to other components, especially to the cellular modem 110 but also potentially to other high power consumption components such as the microphone 150 and camera 160.

All or some of the above features of the security device 100 may be provided as discrete components or integrated together, depending on the implementation.

The security device 100 can be considered as a security response device as it is capable of a security response action. The reader will appreciate that the security device 100 may have further functions.

In this embodiment, the security response device 100 is battery powered only, and installed in an installation site as part of a security system at the installation site. However, the present disclosure does not preclude the provision of a mains power supply to embodiments of the security device 100.

Embodiments of the security device 100 enable cellular or WiFi™ connection to the server 400 such that it is capable of managing power consumption of such a cellular or Wi-Fi™ connection, wirelessly send a threat alert message, and wirelessly listen for a threat response message such that it can receive a human-initiated command. It is an aim that this can be done with minimal power consumption without suffering a detrimentally long latency.

Figure 3:
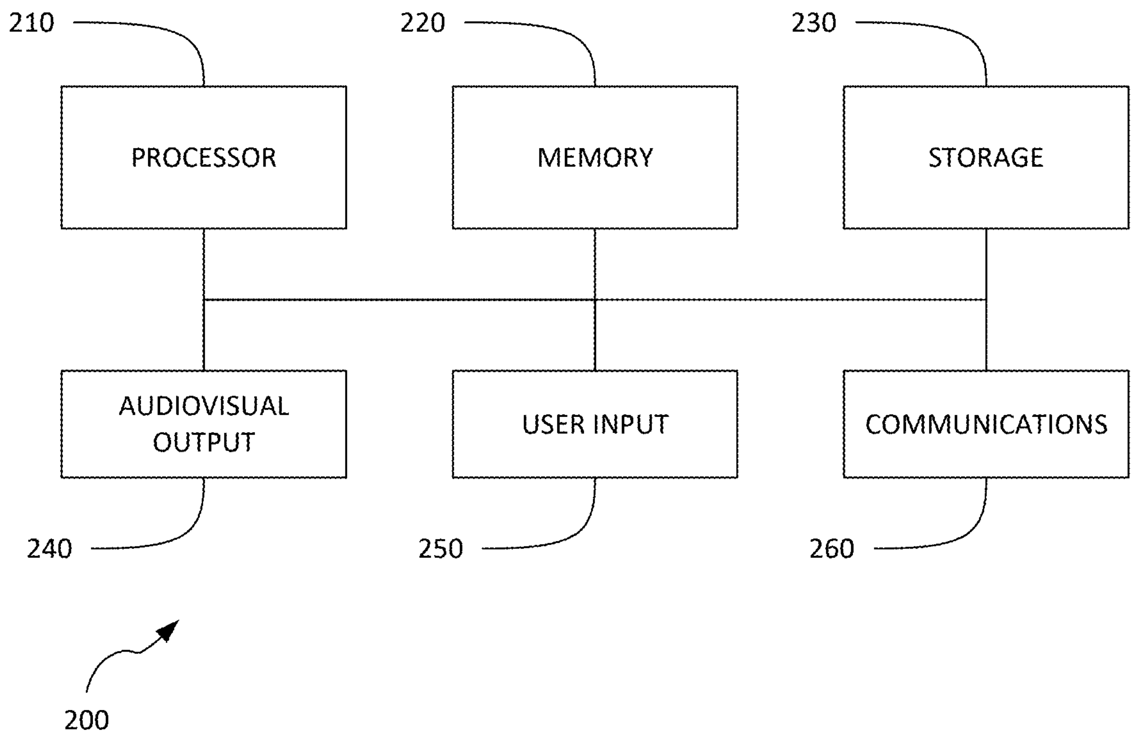
FIG. 3 illustrates a monitoring station of the security network of FIG. 1.

Turning to FIG. 3, the monitoring station 200 may comprise a general purpose computer in conventional form, including a processor 210, a memory 220 for short term retention of processing data, and storage 230 for long term (but potentially slow retrieval) storage of program, processing and informational data. In conventional implementations, the processor 210 may comprise a general purpose microprocessor, capable of executing instructions to obtain desired processing functions. The microprocessor may, in certain implementations, be augmented by more application-specific processing capabilities, such as a graphics processing unit (CPU), a System-on-Chip (SoC) suitable for use in establishing communications, or other functions which will be apparent to the reader. The memory 220 may comprise Read Only Memory (ROM) and Random Access Memory (RAM), as required for the provision of memory storage facilities to the processor 210.

The storage 230 may comprise a magnetic drive, or a solid-state storage device. An audio-visual output facility 240 is provided, such as a visual display unit and speakers, for display and audio output to a user, and a user input device 250, such as a keyboard, pointing device (e.g. mouse) and microphone are provided to enable user input action to the monitoring station 200. A communications facility 260 provides connection to the network 30, for instance through internet connection or a direct LTE protocol connection. Optionally the monitoring station 200 may comprise a plurality of such computers, two or more of which may share at least some hardware resources.

For example, a plurality of user input devices and audio/visual outputs may be provided to at a respective plurality of terminals, each attended by an operator.

Any of the above features of the monitoring station 200 may be provided as discrete devices or integrated together. For instance, a laptop or tablet form computer may have more integration of components than a desktop form computer, simply to enable composition of the computer into a constrained form. A desktop form computer offers certain advantages in terms of being able to swap out particular components, such as to upgrade memory facilities, when the need arises.

Figure 4:
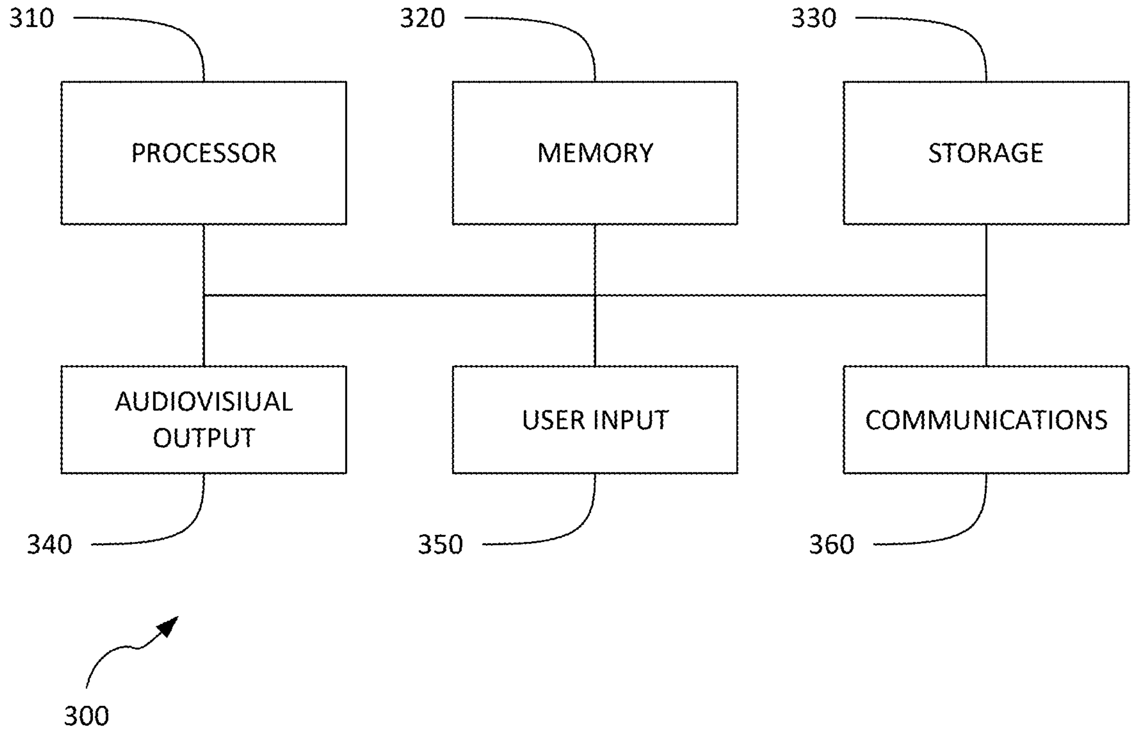
FIG. 4 illustrates a user device of the security network of FIG. 1.

As shown in FIG. 4, the user device 300 comprises a smartphone which itself includes a processor 310, a memory device 320, a storage device 330, audio-visual output 340 in the form of a screen and a speaker, user input 350 in the form of a touchscreen and microphone, and a communications unit 360 in the form of an LTE modem and antenna. As will be appreciated, the various components may be integrated if this is the most effective way of achieving a practical device within constraints of form.

Figure 5:
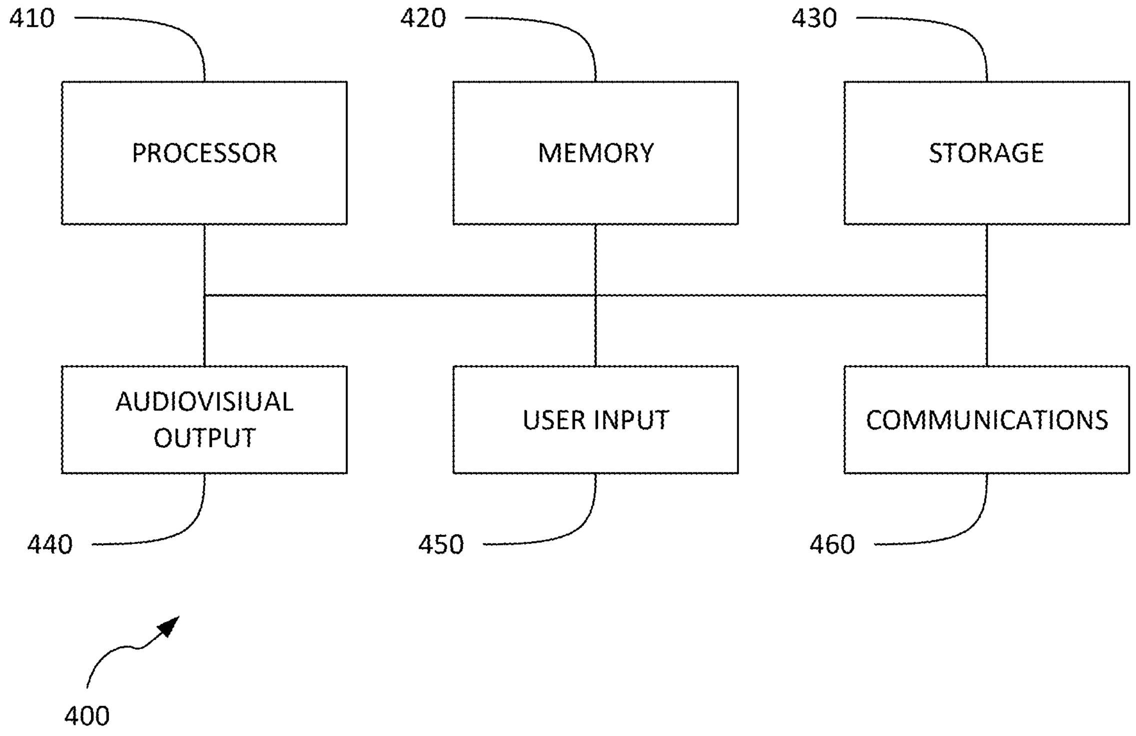
FIG. 5 illustrates a server of the security network of FIG. 1.

The server 400, as shown in FIG. 5, comprises a computing device which includes a processor 410, a memory device 420, a storage device 430, and a communications unit 460 in the form of a modem for establishment of a connection with the network 30. Optionally the server may also comprise an audio-visual output 440 in the form of a screen, user input 450 in the form of a keyboard and pointing device. The server 400 provides an interface between the monitoring station 200 and the user device 300, and the security device 100.

Figure 6:
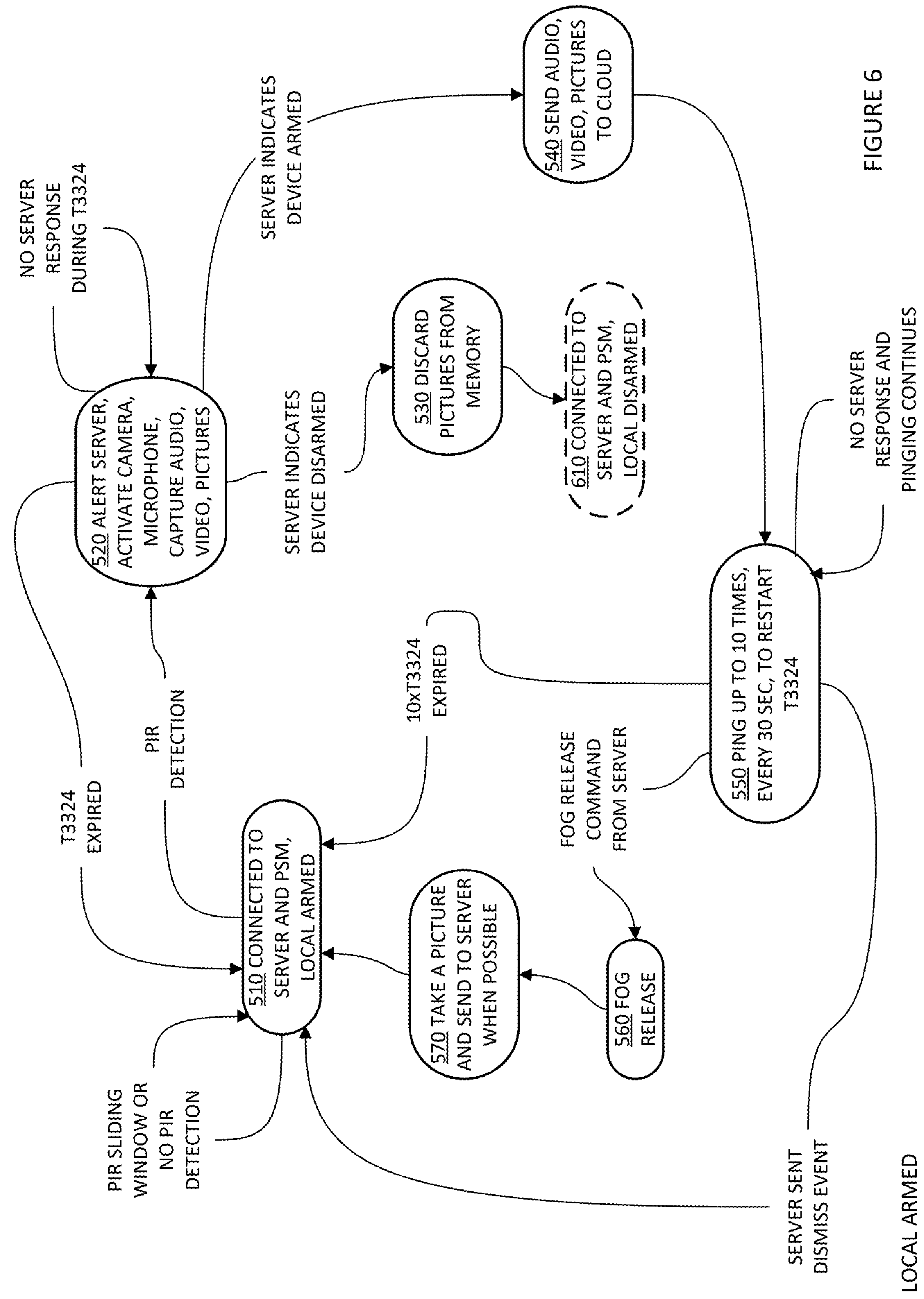
FIG. 6 illustrates a state transition diagram for operation of the security device of FIG. 2 when the device locally holds an armed state.

An exemplary operation of the security device 100, and more particularly the controller 140 of the security device, will become clear from the state transition diagram of FIG. 6.

In the process, the device is normally in a power saving mode, in which components of the device are disabled or powered down to conserve stored electrical energy. Most particularly, it can be advantageous in the power saving mode to keep the cellular modem 110 in a powered down mode, so that it cannot send or receive signals in the cellular network.

Even in the power saving mode, the device is registered to the cellular network and the connection is maintained.

This approach, particularly in the context of an LTE implementation, has certain advantages, since, if it were necessary for a device, on exiting its power saving mode, to firstly register to a network and establish a session, this could expend a substantial period of time. This would add delay to the process, to be described below which, in the context of providing a security system, could have a deleterious impact on operation. So, although not necessarily so in all embodiments, the present disclosure presupposes that the device has already been registered to a network.

In the context of LTE, the registration process would normally involve exchange of configuration information, to enable conduct of cellular communication in conformance with a technical standard. In this exchange, it may be convenient to define certain parameters selectable by a registering LTE device. This could include, for instance, the selection of a duration for network enabled timers such as T3324 and T3412.

In certain implementations, the power saving mode may be contemplated as a "sleep" mode, for example a sleep mode or off condition of a processing chip of the device 100 may utilized. However, it should be noted that, even in this mode, certain parts of the functionality of the device 100 will remain active, notably the threat detection functionality.

Upon occurrence of a predefined condition (namely a sensed security threat), the device exits the power saving mode and the cellular modem 110 is then powered up and capable of communicating.

FIG. 6 illustrate the device 100 as being in the power saving mode and holding a locally stored arming status of "armed", in a state as identified 510. It is preferable that, in state 510 the device remains connected to (e.g. registered with, etc) the cellular network. In this state, on the trigger of a sensed security threat (e.g. a PIR detection), the device 100 switches to an alert state in which the communications interface 110 is in discontinuous receive mode and a timer is started for remaining in the alert state. As indicated in FIG. 6, the state 520, labelled "Alert Server", corresponds to the sending of a communication from the device 100 to the server 400, so that the server 400 is aware of the PIR detection. The sending of the communication indicating the occurrence of the PIR detection starts the timer. Meanwhile, or immediately preceding the sending of the communication, the device 100 responds to the sensed security threat on the assumption that its locally stored arming state of armed is correct, thus activating its camera and microphone, and capturing audio, video and pictures as the implementation requires.

In the context of the 4G/LTE standardised protocols, the timer set at this stage for establishment of the alert state 520 can be the T3324 timer, and while this timer is running the device 100 is in Discontinuous Receive (i.e. DRX) Mode. Until this timer expires, the device 100 can be considered capable of receiving a signal from the server 400 via the 4G/LTE cellular network. At the expiry of the timer, the device 100 will return to the power saving mode of state 510, in which it will be "connected" to but not able to receive traffic from the cellular network. In other words, it is registered to the network but cannot be accessed by the cellular network. The device 100 will remain in the power saving mode (state 510) until the device 100 next sends a transmission.

In exemplary embodiments, it is considered to set T3324 as 30 s. Lower values, such as 20 s may be possible, and the 4G/LTE suite of standards generally provide for T3324 to be 16 s or more. The value of T3324 is set on registration of the device 100 with the cellular network.

Independent of timer T3324, another timer T3412 (extended tracking area update timer) operates, which determines the regularity of sending a "tracking area update", and is set to for example 2 hours. When sending the tracking area update, the device 100 uses this wakeup opportunity to also send status and log information to the server and to enable software updates therefrom, in response. The tracking area update and these communications to the server 400 is the only reason why the device 100 needs to wake other than in response to a sensed security threat.

If necessary, the values set for Timer T3412 and T3324 can be requested/changed from the network during ATTACH REQUEST (when connecting to the network) or a TRACKING AREA UPDATE REQUEST.

So, as indicated, the controller 140 is maintained in state 520 while no response has been received from the cloud to the security threat signal. There are three possible ways in which the controller transitions from state 520.

Firstly, timer T3324 can expire, without receipt of a signal at the device 100. Such an scenario would be rare because it would require a fault with the network or the server 400, so is not integral to the present disclosure. Indeed, any number of possible device response may occur in such an event, but in one example, on expiry of T3324, the device 100 returns to state 510 in which it is in the power saving mode, and is thus unresponsive to any signals transmitted to it, for example it would not be able to receive such a signal were such a signal sent transmitted to it.

Secondly, a response can be received from the server 400, that the security device is disarmed. In this case, the controller 140 transfers to state 530, and the captured pictures, audio and/or video are discarded from memory. The locally stored arming state is updated to disarmed, and the device 100 is then in a corresponding state, 610, to state 510, as further illustrated in FIG. 7 to be described in due course.

Thirdly, a response can be received from the server 400 during the pendency of the T3324 timer that the security device 100 is armed. In this case, the controller transitions to state 540 in which audio and/or video captured from the microphone 150 and camera 160 in state 520 are sent to the server 400 and then on to the monitoring station 200 or user device 300 as the case may be. At this point, the monitoring station 200, as in the illustrated example, or alternatively the user device 300, waits for a user response.

Figure 9:
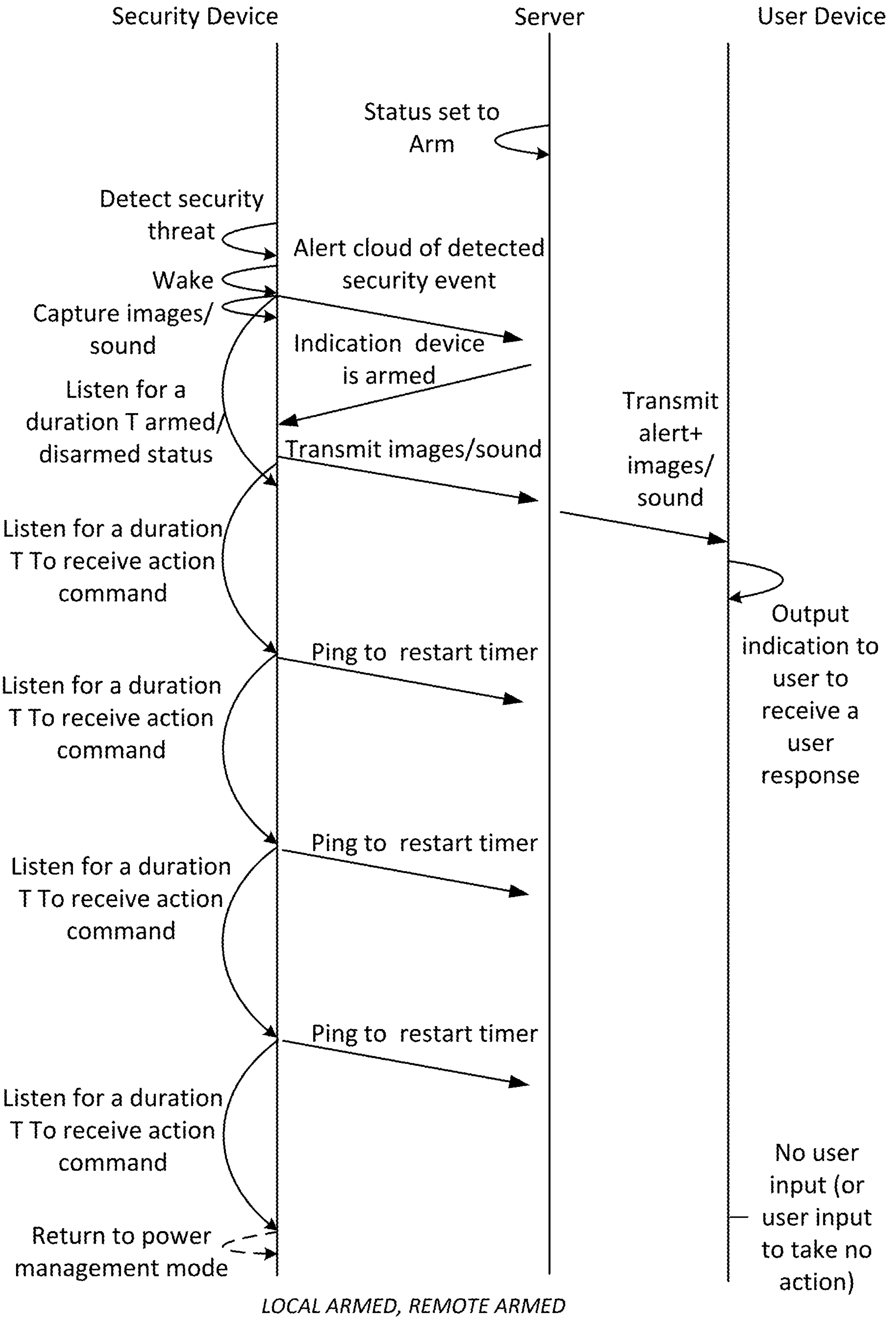
FIG. 9 illustrates a swim-lane diagram for operation of the security device in accordance with the configuration of FIGS. 6 and 7 in a second case.

Then, once these captures are sent, the controller 140 transitions to state 550 in which a ping (an alert) is sent to the cellular network, causing T3324 to be restarted. In an embodiment, this restart occurs up to a maximum number of times, which may for example be between 4 and 15. The maximum number of times is indicated as 10 times, as a specific example, in FIG. 6 but, as shown in FIG. 9 for reasons of clarity, the maximum number can be 4. As shown, no response is received from the server to the sending of the audio or video captures, because no user input action has been received at the monitoring station 200. The restarting of the timer a predetermined number of times is to provide a maximum threat verification period selected to be of sufficient time for a person at the monitoring station 200 to decide whether and/or how to respond via a user input action. During this period the person at the monitoring station may request that the device 100 performs one or more further verification actions (e.g. further photographs or videos) and/or may request that the device 100 performs one or more deterrent actions. In example embodiments the person may be provided with a maximum threat verification period having a value that is preferably in the range of 120 to 720 seconds. In some embodiments the value is more narrowly in the range of 240 to 560 seconds. As an example, the value may be assumed to be 300 seconds, so in embodiments in which T3324 restarts 10 times, T3324 is set to 30 seconds, while in the case of T3324 restarting 4 times, it is set to 75 seconds.

If, after the maximum number of restarts of T3324, there is no response from the server 400, then the controller 140 reverts to state 510.

Figure 7:
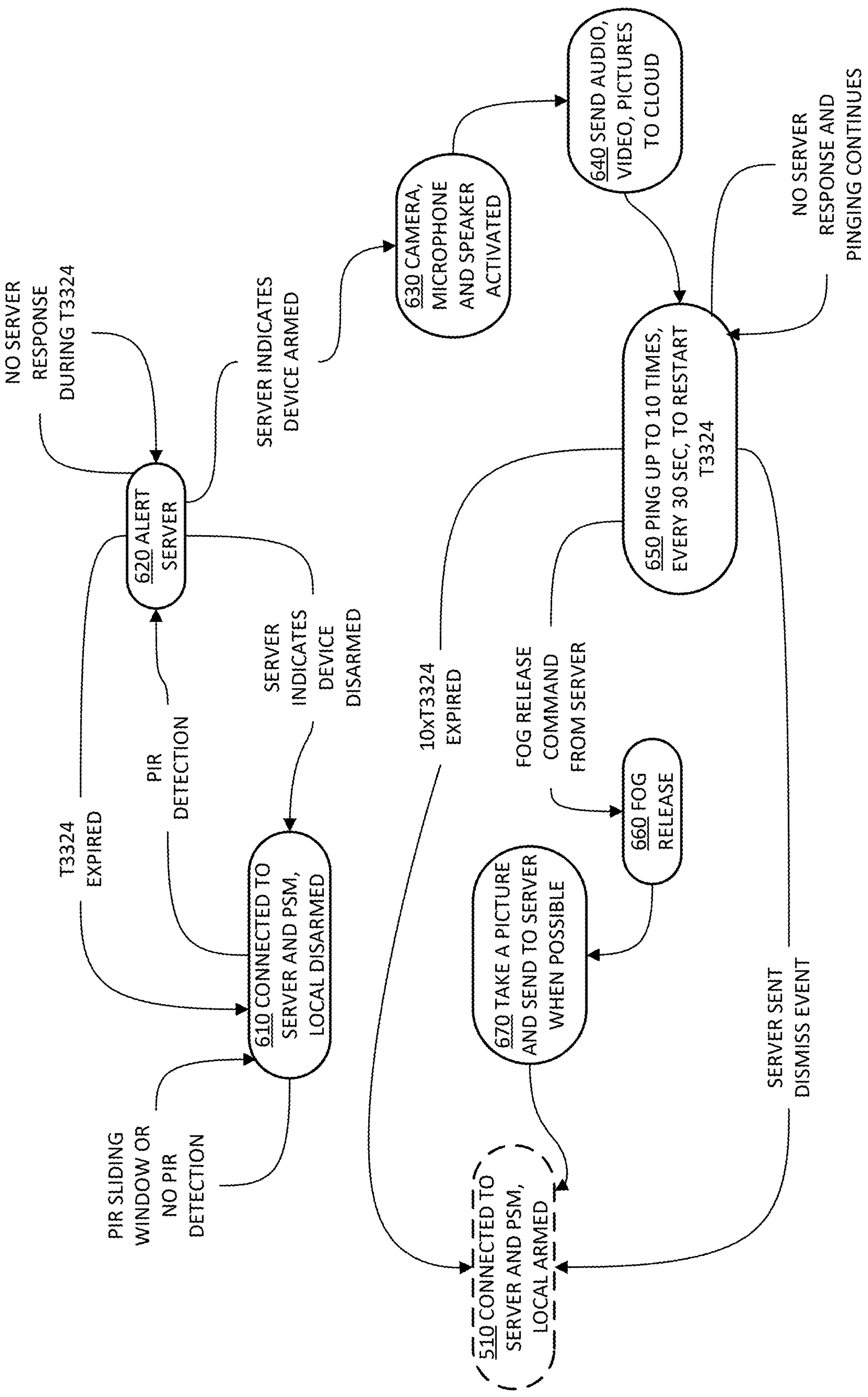
FIG. 7 illustrates a state transition diagram for operation of the security device of FIG. 2 when the device locally holds a disarmed state.

FIG. 7 illustrate the device 100 as being in the power saving mode and holding a locally stored arming status of “disarmed”, in a state as identified 610. As before, it is preferable that, in state 610 the device remains connected to (e.g. registered with, etc) the cellular network. In this state, on the trigger of a sensed security threat (e.g. a PIR detection), the device 100 switches to an alert state in which the communications interface is in discontinuous receive mode and a timer is started for remaining in the alert state. As indicated in FIG. 6, the state 620, labelled “Alert Server”, corresponds to the sending of a communication from the device 100 to the server 400, so that the server 400 is aware of the PIR detection. The sending of the communication indicating the occurrence of the PIR detection starts the timer. A T3324 timer is set, as previously described.

In this scenario, however, no further action is taken until a server response is received, or a timeout of T3324 occurs.

So, as indicated, the controller 140 is maintained in state 620 while no response has been received from the cloud to the security threat signal. There are three possible ways in which the controller transitions from state 620.

Firstly, timer T3324 can expire, without receipt of a signal at the device 100. Such an scenario would be rare because it would require a fault with the network or the server 400, so is not integral to the present disclosure. Indeed, any number of possible device response may occur in such an event, but in one example, on expiry of T3324, the device 100 returns to state 610 in which it is in the power saving mode, and is thus unresponsive to any signals transmitted to it, for example it would not be able to receive such a signal were such a signal sent transmitted to it.

Secondly, a response can be received from the server 400, that the security device is disarmed. In this case, the controller 140 transfers back to state 610.

Thirdly, a response can be received from the server 400 during the pendency of the T3324 timer that the security device 100 is armed. In this case, the controller transitions to state 630, in which the device 100 now, for the first time since sensing the security threat, activates its camera and microphone, and capturing audio, video and pictures as the implementation requires.

The reader will appreciate that the delay between sensing the security threat, and entering state 630 in which the pictures and audio are captured, may create a possibility that the security threat may fail to be captured. However, this provides a suitable compromise between requiring the device to behave as if it is always armed (which would lead to unnecessary power consumption) and the potential risk of not being able to quickly enough capture a video or other verification information for verifying the detected threat.

The device 100 then transitions to state 640 in which audio or video captured from the microphone 150 and camera 160 in state 630 are sent to the server 400 and then on to the monitoring station 200 or user device 300 as the case may be. At this point, the monitoring station 200, as in the illustrated example, or alternatively the user device 300, waits for a user response.

Then, once these captures are sent, the controller 140 transitions to state 650 in which a ping (an alert) is sent to the cellular network, causing T3324 to be restarted. In an embodiment, this restart occurs up to a maximum number of times, which may for example be between 4 and 15. The maximum number of times is indicated as 10 times, as a specific example, in FIG. 7 but, as shown in FIG. 9 for reasons of clarity, the maximum number can be 4. As shown, no response is received from the server to the sending of the audio or video captures, because no user input action has been received at the monitoring station 200. The restarting of the timer a predetermined number of times is to provide a maximum threat verification period selected to be of sufficient time for a person at the monitoring station 200 to decide whether and/or how to respond via a user input action. During this period the person at the monitoring station may request that the device 100 performs one or more further verification actions (e.g. further photographs or videos) and/or may request that the device 100 performs one or more deterrent actions. In example embodiments the person may be provided with a maximum threat verification period having a value that is preferably in the range of 120 to 720 seconds. In some embodiments the value is more narrowly in the range of 240 to 560 seconds. As an example, the value may be assumed to be 300 seconds, so in embodiments in which T3324 restarts 10 times, T3324 is set to 30 seconds, while in the case of T3324 restarting 4 times, it is set to 75 seconds.

If, after the maximum number of restarts of T3324, there is no response from the server 400, then the controller 140 reverts to state 510, as the device has a local armed state.

The reason for using iterations of T3324 (ten in this case, but it may be more or fewer) rather than another timer, is that 4G/LTE provides only this timer for supporting discontinuous receive mode. This means the value selected for T3324 is important because it involves a trade-off between multiple variables in order to minimise power consumption, as will now be explained.

In order for the security device 100 to restart T3324, the security device 100 must make a transmission to the cellular network. Such transmissions consume a relatively large amount of energy. Therefore, on one hand it is advantageous to minimise the total number of transmissions needed to reach the desired maximum threat verification period. However, using fewer transmissions would require T3324 to be greater—as mentioned above, in the cases exemplified above, using four T3324 restarts would require T3324 to be set to 75 seconds, whereas using ten T3324 re-transmissions would require T3324 to be set to 30 seconds. The device 100 must operate in a communications mode, albeit a discontinuous one, for the entirety of the period defined by T3324, i.e. 75 or 30 seconds in these examples, and operating such a mode consumes more power than when in the power saving mode. Thus, having T3324 set to higher value wastes power if the security device 100 turns out to have been set to a disarmed state, because learning the arming state from the server 400 is relatively quick, e.g. within 1 second, which is only a small fraction of the time in which provided device 100 must stay in the communications mode listening for the arming state. By the same rationale, if T3324 is set to a small value so as to waste minimal energy listening for arming states that could turn out to be disarmed, then more pings and (therefore more energy consumption) are needed from the device 100 to provide the desired maximum threat verification period.

The precise values set for T3324 and the total pendency window (and therefore by implication the number of pings) may be application specific and may be determined empirically or by calculation, based on the considerations described above.

In another example, T3324 is configured to a value between 16 and 60 seconds, e.g. 30 seconds; and the maximum threat verification period is controlled to be 500 seconds.

As will be appreciated from the examples about the value configured for T3324 is the same when the device is the power saving mode as during the threat verification period.

It is a safety benefit of the device 100 that, particularly where the device can output a strong deterrent, once the maximum threat verification period expires, the device 100 returns to a power saving mode in which it cannot receive a command to output the deterrent.

In some embodiments, if a facility is provided for a user to make an active decision to take no action in response to an indication of a security threat, for instance at the monitoring station 200, the monitoring station 200 could send, via the server 400, a dismiss command to the security device. This could occur, for instance, if a user at the user device 300 sees the video capture but perceives no risk (for instance, the PIR has been triggered by a household pet). In this case, the dismiss command would cause the controller 140 to revert to the state 510 (the device 100 having a locally recorded armed state), optionally without the device 100 causing any further T3324 restarts. If this occurs before the maximum number of permitted T3324 restarts, then threat verification period will be less the maximum threat verification period.

The facility to prompt a user to make an active decision may, in some embodiments, be governed by a timer synchronised with the amount of time remaining at the security device before exhaustion of iterations of the T3324 timer. The amount of time will be known at the server by virtue of receiving each ping that had restarted the timer. The amount of time remaining can then serve a timer to the user device. This enables display of a countdown indicating to the user an amount of time remaining before a decision can no longer be made and input to the user device. The countdown display may display a time which may include a reduction to compensate for user reaction time and system latency, to encourage a user to make an early decision, so that the user's decision can be conveyed to the security device in due time.

In an alternative embodiment, a countdown display need not be provided to the user—it may, for example, simply be sufficient to make an indication (audible or visual) to the user that the time for input has expired.

FIGS. 8 to 11 lay out certain operational scenarios in the form of swim-lane diagrams, based on the state transition diagrams of FIGS. 6 and 7.

Figure 8:
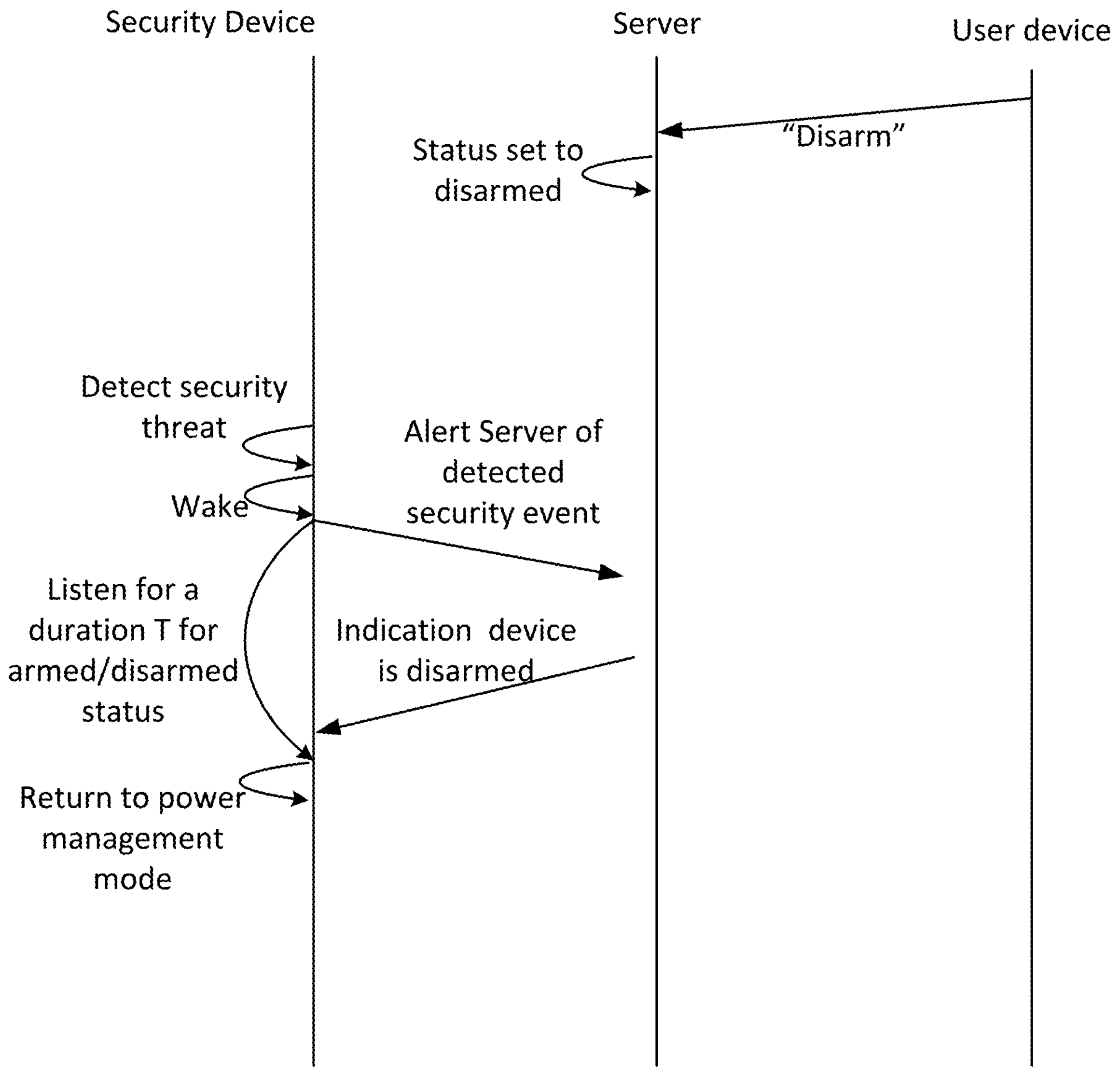
FIG. 8 illustrates a swim-lane diagram for operation of the security device in accordance with the configuration of FIGS. 6 and 7 in a first case.

As shown in FIG. 8, the server 400 has earlier been configured, such as by user input command, to set the arming status of the device 100 to disarmed. As a result of earlier processing, or for example an exchange of messages during a tracking area update or other signal transmission to maintain a connection to a service and/or to tell a server that the device is still functioning healthily, the device locally holds a status of disarmed. Thus, when a security threat is detected, the device 100 sends a threat detection message to the server 400 and awaits further commands. The server 400 responds with confirmation that the arming status is disarmed, and the routine ends.

In another scenario, the server 400 has earlier been configured, such as by user input command, to set the arming status of the device 100 to armed. As a result of earlier processing, or for example an exchange of messages during a tracking area update other signal transmission to maintain a connection to a service and/or to tell a server that the device is still functioning healthily, the device locally holds a status of armed.

Thus, in response to a security threat being detected, the device 100 captures a verification image or video and sends a threat detection message to the server 400 which includes the verification image or video. As shown, a response is received by the security device 100 that the device is armed, in the first T3324 time period. This transmission triggers commencement of another T3324 time period, and the device 100 sits in state 550, pinging up to ten times and restarting T3324 while it waits for a server response. The verification images and/or sound are then sent to the server 400 on the cellular connection. In this scenario, the server 400 causes the initiation of a presentation, at the monitoring station, of a prompt to a user for a user response.

Following user input action at the monitoring station or at the user device 300, one or more threat response commands to perform a deterrent action and/or further verification actions may be sent from the server 400 to the security device 100 during the verification period. Images and/or sound from any such further verification actions are sent to the server 400 on the cellular connection in state 540. In the example in FIG. 9, a user response is ultimately received for the security device 100 to perform a deterrent action. A corresponding action command is sent back to the security device 100 via the server 400. This action command, in this case, is a light-obscuring substance release command. The figures refer to the light-obscuring substance as being fog, but the light-obscuring substance may specifically be or comprise smoke.

Receipt of the light-obscuring substance release command causes the controller 140 to transition to state 560, which initiates release of a security light-obscuring substance by the alarm output actuator 130. Once the light-obscuring substance has been released, the controller 140 transitions to state 570, in which a further capture is made by the camera 160 of the observed scene, and sent to the user device 300 or the monitoring station 200 as the case may be, a person at the receiving device that the light-obscuring substance has been released. Once this has been completed, the controller reverts to state 510. Capture of an image of the scene after the emission of the light-obscuring substance is not essential to this embodiment and so the device can transition directly to state 510 instead.

Similarly in the scenario illustrated in FIG. 7, states 660 and 670 correspond to states 560 and 570, with a transition back to state 510 on completion, taking into consideration that the device now holds a local armed state.

By entering into state 510, the device 100 powers down; that is, all unnecessary components are moved into a power saving state. As the reader will appreciate, this can include the cellular modem 110, the microphone 150, the camera 160 and the alarm output actuator 130. However, the device may maintain its ability to monitor the environment for a security threat, e.g. by means of PIR motion detection, to thereby trigger the reawakening of the device upon detection of such an event. As will be understood from the description herein, since the locally stored arming status may not correspond with the remotely stored arming status but the most recently known status is of an armed state, the device 100 treats all subsequent threat detection events as automatically requiring a verification action.

Figure 10:
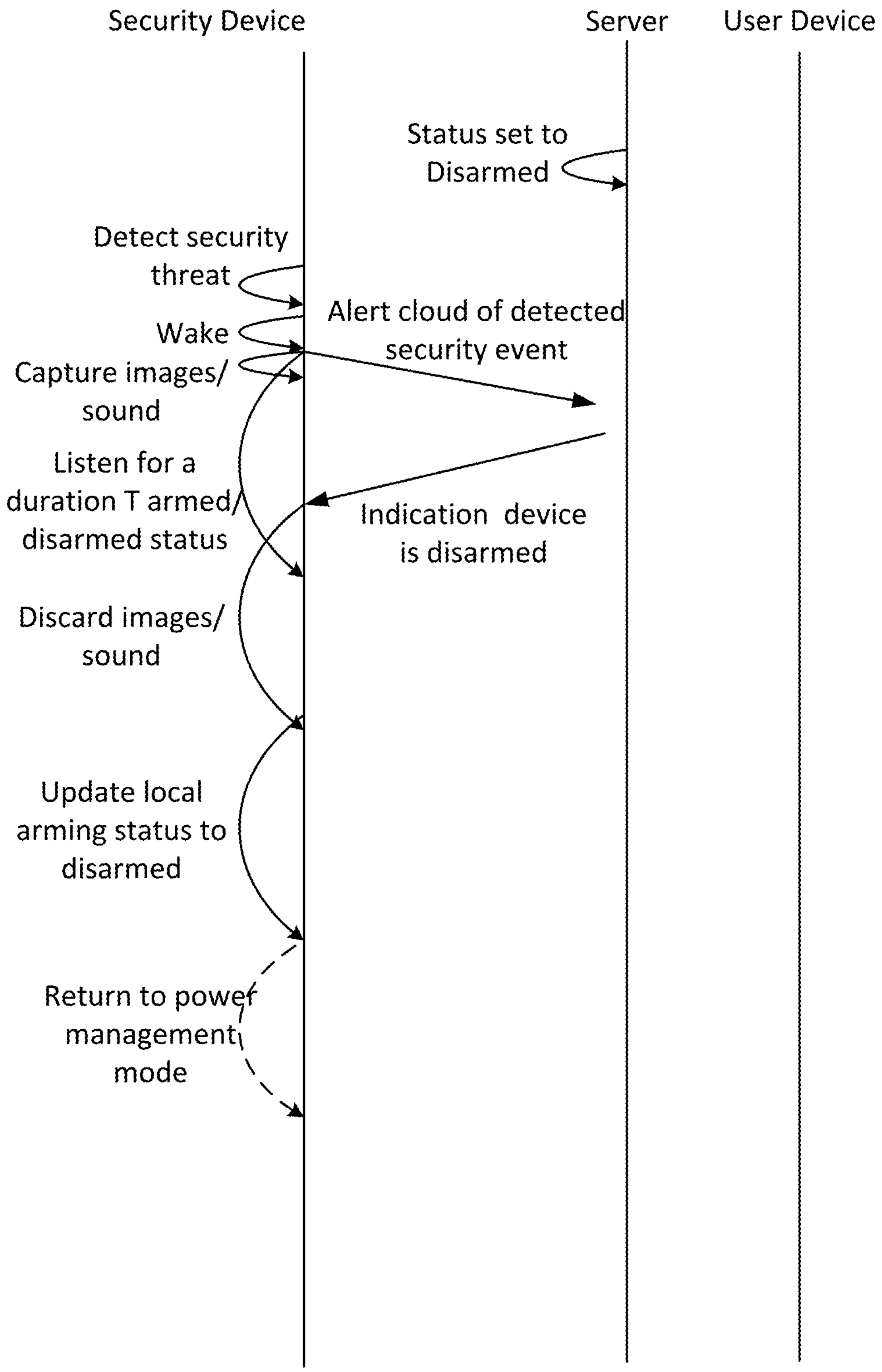
FIG. 10 illustrates a swim-lane diagram for operation of the security device in accordance with the configuration of FIGS. 6 and 7 in a third case.

FIG. 10 illustrates the behaviour of the device when its locally stored arming status is armed, but the remotely stored arming status is disarmed. In this case, the device 100, on detection of a threat, immediately captures audio and video as the implementation requires. Then, on receiving a signal from the server 400 that, in actual fact, the arming status of the device 100 is disarmed, the captures are discarded without the computational and power consumption expense of transmitting them to the server, and the device 100 is then sent back to a low power consumption state.

Figure 11:
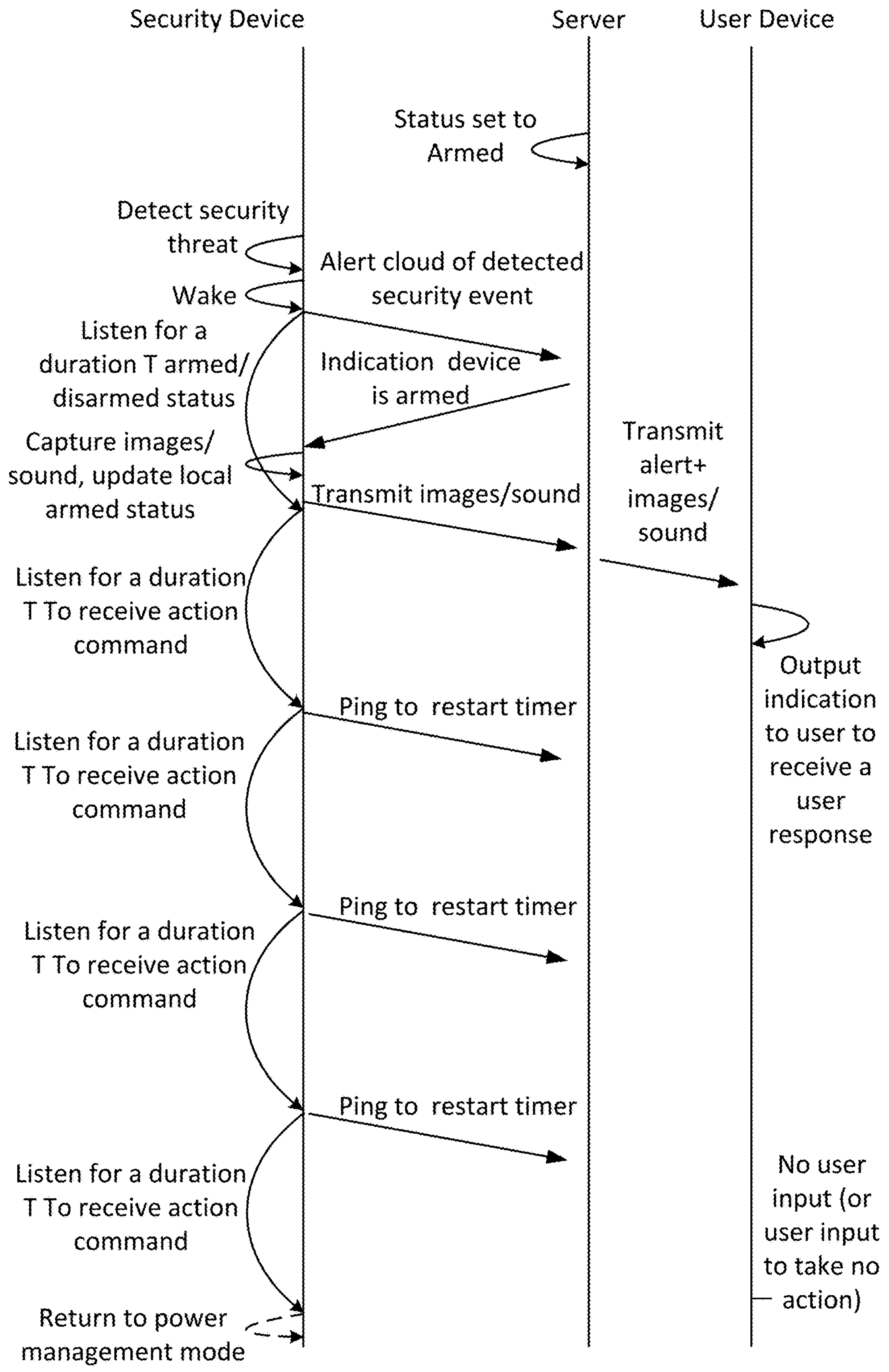
FIG. 11 illustrates a swim-lane diagram for operation of the security device in accordance with the configuration of FIGS. 6 and 7 in a fourth case.

FIG. 11, finally, lays out the scenario wherein the device locally stores a disarmed status, but in actual fact, the remotely stored arming status is armed. Since the locally stored arming status is disarmed, when the device wakes up, it does not immediately capture audio or video, as to do so despite its locally stored disarmed status could needlessly consume power. Instead, it waits for confirmation of its arming status. On receiving a message that, in fact, its arming status is armed, it responds by making captures of audio and video, and sending them back to the server. At that point, the device 100 waits for further action, e.g. by commands to perform further verification actions and/or to perform any deterrent actions.

In each of the four scenarios illustrated in FIGS. 8 to 11, no user-commanded action or user-commanded threat response is conveyed to the device 100. This is purely to enable the embodiments to be described succinctly. However, the reader will appreciate that, during the waiting period, a response may be received and, in the case of FIGS. 9 and 11, suitable action at the device 100 may be effected.

To avoid repeated messaging, a block-out timer may be set, during which further security event detections are not reported. The block-out timer may be initiated by the sending of a security event detection message, or any action consequent thereon.

All of the above examples have been described in the context of a battery powered security device 100. In that case, it is clear that the benefit of limiting use of the wireless communications interface is that it manages power consumption. However, certain benefits can still arise even if the security device 100 is equipped with an external power supply, such as mains power. In that case, it may still be advantageous to avoid an "always on" cellular connection. For instance, a provider of a cellular service may impose increased charges for a persistent connection, and it may be desirable therefore to limit access to the network. Further, it may be desirable to avoid a persistent connection, which could be vulnerable to attacks such as a man-in-the-middle attack.

However, it may be possible to make a distinction between the behaviour of the controller when connected to an external power supply and when reliant on a local battery supply. So, for instance, the number of iterations of T3324, at either the described full count limit or the interim count limit, may be dependent on the power supply condition. So, for example, without power supply constraint, the device 100 may be permitted to iterate T3324 more times, so as to listen for an action command, than if it is subject to battery power supply constraint.

Where reference is made in this disclosure of an emitted deterrent, such an emitted deterrent can, in general terms, comprise light, audio, tear gas, visible-light obscuring matter, fluid, paralyzing substance, pepper spray, sneeze inducing spray, a high output sound pressure, an electrically conductive projectile, a stink bomb, intermittent light, a physical deterrent, a physiologically affecting deterrent, or a psychologically affecting deterrent.

As used herein, except where the context requires otherwise, the terms "comprises", "includes", "has", and grammatical variants of these terms, are not intended to be exhaustive. They are intended to allow for the possibility of further additives, components, integers or steps.

The terms "power saving mode" and "discontinuous receive mode" may optionally be understood as having the same meaning as ascribed to such terms in reference to LTE.

The embodiments described above are intended to be indicative, and are not limiting on the scope of protection sought, which should be determined on the basis of the claims appended hereto.

Any embodiments herein in relation to a device or system is also applicable to a method and to a computer program product, which may take the form of a processor executable non-transient memory for storing instructions which when executed by the processor cause the performance of the method. Alternative implementations of a computer program product are contemplated as part of the present disclosure, including that such a product may be delivered by way of a downloaded signal from a server, and may be in the form of an update or cooperative product to one or more computer program products already installed in the device.

What is claimed is:

1. A security response device comprising:

a wireless communications interface for wirelessly communicating with a remote computing system according to a wide area network, WAN, address of the remote computing system and/or an identifier for determining the WAN address;

a security threat sensor for detecting a security threat; and a local arming state store for storing a local arming state, the local arming state being a record of a most recently known state of a remote arming state of the device as stored in a remote arming state store, the remote arming state being selected from a group comprising armed and disarmed;

wherein the device is operable in a power saving mode in which the device is incapable of receiving a wireless communications signal via the wireless communications interface, or a communication mode in which the device is capable of receiving, via the wireless communications interface, a wireless communications signal;

the device being responsive to a security threat detected by the security threat sensor to:

if the device is in the power saving mode, place itself in the communications mode;

transmit, using the wireless communications interface, a security threat detection signal;

check its local arming state stored in the local arming state store, and:

if the local arming state is armed, to:

perform a verification action in which a device other than said security threat sensor is used to gather security threat information to enable a verification of the detected security threat; and if the local arming state is disarmed, to:

not perform said verification action at least until receipt, via said wireless communications interface, of a response to said security threat detection signal indicating the remote arming state, and then upon receiving the response to:

if the remote arming state as indicated in the response is armed, perform a response action.

2. A device in accordance with claim 1 wherein the response action is the verification action.

3. A device in accordance with claim 1, wherein if said local arming state is armed the device additionally listens for a response to said security threat detection signal indicating the remote arming state, and if the local arming state is armed before receipt of the response to said security threat detection signal and the response indicates the remote arming state is disarmed, the device is configured to discard the gathered security threat information.

4. A device in accordance with claim 1, wherein irrespective of whether the local arming state is armed or disarmed before receipt of the response to said security threat detection signal, if the response indicates the remote arming state is disarmed, the device is configured to enter the power saving mode.

5. A device in accordance with claim 1, wherein on receipt of a response to said security threat detection signal indicating the remote arming state, the device is configured to update the local arming state in accordance with the indicated remote arming state at least in an event that the local arming state does not match the remote arming state.

6. A device in accordance with claim 1 wherein the wireless communications interface comprises a cellular modem for the wirelessly communicating with the remote computing system.

7. A device in accordance with claim 1 wherein the device is operable, in the communications mode, to remain in the communications mode for a security response action instruction period defined by a security response action instruction period timer.

8. A device in accordance with claim 1 wherein the device is commandable to perform a further threat verification action during a security response action instruction period that is commenced upon receiving a response to the security threat detection signal, conditional upon the response to the security threat detection signal indicating that the remote arming state is armed.

9. A device in accordance with claim 1 wherein the device is commandable to perform a threat deterrent action during a security response action instruction period that is commenced upon receiving a response to the security threat detection signal, conditional upon the response to the security threat detection signal indicating that the remote arming state is armed.

10. A device in accordance with claim 9, wherein the deterrent comprises a deterrent that is neither visual or nor audio.

11. A device in accordance with claim 1 and comprising an image capture device operable to capture an image of a scene, wherein the threat verification action comprises capturing one or more images of the scene.

12. A device in accordance with claim 1, wherein the device is configured, when in power saving mode, to periodically wake from the power saving mode to enter the communication mode and transmit a maintenance signal and remain in the communication mode for a wake period sufficient to receive any response signal from the remote computing system, and to re-enter the power saving mode on expiry of the wake period.

13. A device in accordance with claim 12 operable, on receipt during the wake period of a response signal from the remote computing system, to extract therefrom an indication of the remote arming state of the device, and to update the local arming state in accordance with the indication of the remote arming state.

14. A system comprising a security response device in accordance with claim 1, and comprising said remote computing system, the remote computing system comprising said remote arming state store for storing a remote arming state for the device, the remote computing system being responsive to receipt of said security threat detection signal from the device to send said response.

15. A method of managing power consumption at a security response device, wherein the device comprises a wireless communications interface for wirelessly communicating with a remote computing system according to a wide area network, WAN, address of the remote computing system and/or an identifier for determining the WAN address, a security threat sensor for detecting a security threat; and a local arming state store for storing a local arming state, the local arming state being a record of a most recently known state of a remote arming state of the device as stored in a remote arming state store, the remote arming state being selected from a group comprising armed and disarmed;

placing the device in one of a power saving mode in which the device is incapable of receiving a wireless communications signal via the wireless communications interface, or a communication mode in which the device is capable of receiving, via the wireless communications interface, a wireless communications signal;

wherein in response to a security threat detected by the security threat sensor the method comprises:

if the device is in the power saving mode, placing the device in the communications mode;

transmitting, using the wireless communications interface, a security threat detection signal;

checking the local arming state stored in the local arming state store, and:

if the local arming state is armed:

performing a verification action in which a device other than said security threat sensor is used to gather security threat information to enable a verification of the detected security threat; and if the local arming state is disarmed:

not performing said verification action at least until receipt, via said wireless communications interface, of a response to said security threat detection signal indicating the remote arming state, and then upon receiving the response:

if the remote arming state as indicated in the response is armed, performing a response action.

16. A method in accordance with claim 15 wherein the response action is the verification action.

17. A method in accordance with claim 15 wherein the wireless communications interface comprises a cellular modem for the wirelessly communicating with the remote computing system.

18. A method in accordance with 15 wherein, in the communications mode, maintaining the device in the communications mode for a security response action instruction period defined by a security response action instruction period timer.

19. A method in accordance with 15 and comprising an image capture device operable to capture an image of a scene, wherein the verification action comprises capturing one or more images of the scene.

20. A computer program product in the form of a processor executable non-transient carrier medium for storing instructions, which when executed by a processor, cause the performance of a method of managing power consumption at a security response device, wherein the device comprises a wireless communications interface for wirelessly communicating with a remote computing system according to a wide area network, WAN, address of the remote computing system and/or an identifier for determining the WAN address, a security threat sensor for detecting a security threat; and a local arming state store for storing a local arming state, the local arming state being a record of a most recently known state of a remote arming state of the device as stored in a remote arming state store, the remote arming state being selected from a group comprising armed and disarmed;

placing the device in one of a power saving mode in which the device is incapable of receiving a wireless communications signal via the wireless communications interface, or a communication mode in which the device is capable of receiving, via the wireless communications interface, a wireless communications signal;

wherein in response to a security threat detected by the security threat sensor the method comprises:

if the device is in the power saving mode, placing the device in the communications mode;

transmitting, using the wireless communications interface, a security threat detection signal;

checking the local arming state stored in the local arming state store, and:

if the local arming state is armed:

performing a verification action in which a device other than said security threat sensor is used to gather security threat information to enable a verification of the detected security threat; and if the local arming state is disarmed:

not performing said verification action at least until receipt, via said wireless communications interface, of a response to said security threat detection signal indicating the remote arming state, and then upon receiving the response:

if the remote arming state as indicated in the response is armed, performing a response action.

* * * * *